United States Patent [19]

Blair

[11] Patent Number: 4,668,529
[45] Date of Patent: May 26, 1987

[54] FILLER COMPOSITION AND METHOD

[75] Inventor: Doyce T. Blair, Broomfield, Colo.

[73] Assignee: Ronald L. Berry, Golden, Colo.

[21] Appl. No.: 722,652

[22] Filed: Apr. 12, 1985

[51] Int. Cl.$^4$ .......................... C08J 3/28; C08L 63/10; B05D 7/24

[52] U.S. Cl. .................................... 427/54.1; 427/142; 427/287; 522/14; 522/79; 522/82; 522/170

[58] Field of Search ...................... 204/159.15, 159.23; 427/54.1, 142, 287; 522/14, 79, 82, 170

[56] References Cited

U.S. PATENT DOCUMENTS

| | | | |
|---|---|---|---|
| 4,131,715 | 12/1978 | Frankel | 427/142 |
| 4,156,035 | 5/1979 | Tsao et al. | 204/159.15 |
| 4,323,591 | 4/1982 | Wendling et al. | 204/159.23 |
| 4,340,453 | 7/1982 | Noomem | 204/159.23 |
| 4,382,102 | 5/1983 | Noomen | 427/54.1 |
| 4,593,051 | 6/1986 | Kolske | 427/54.1 |

*Primary Examiner*—Allan M. Lieberman
*Attorney, Agent, or Firm*—Wood, Dalton, Phillips Mason & Rowe

[57] ABSTRACT

A filler composition curable by subjection to ultraviolet radiation and the method of repairing deformities in wall elements by utilization of the composition. The composition is advantageously adapted for use in vehicle body repair. The composition is a single component epoxy system facilitating storage and use on site. Curing of the composition may be effected at relatively low temperatures such as down to approximately 30° F. Curing of the composition is effected rapidly for further improved efficiency in the repair operations utilizing the compound.

15 Claims, No Drawings

FILLER COMPOSITION AND METHOD

BACKGROUND OF THE INVENTION

1. Field of the Invention

This invention relates to repair of deformities in wall elements such as holes and dents in automobile bodies and in particular to an improved filler compound for use therein and method of utilizing the same in such repair.

2. Description of the Background Art

It is conventional in the repair of deformities such as holes and dents in automobile bodies to provide a filler compound which is caused to set following application to the deformity permitting the compound then to be sanded and finished with suitable painting steps in effecting the repair of the automobile body.

It is conventional to utilize two-component settable resin systems for this purpose conventionally comprising a mixture of a base and a hardening agent. It is conventional to control the curing time by controlling the amount of hardener included in the mixture. Such curing further is a function of the length of time the applied material is exposed to the ambient atmosphere and light. Depending on the area of the repair, substantial time may be required to effect full curing of the entire body of applied material.

It is further conventional to require the mixing of the base and hardening agent at the time of desired use. Thus it is necessary to mix the ingredients in accurately determined quantities. Such a requirement presents the serious problem of possible incorrect ratios and the need for taking the additional time to effect such mixing.

The invention further comprehends the method of filling deformities in a vehicle body wall for repair thereof, comprising the steps of applying to a deformity a body of filler composition comprising a mixture of epoxy resin, cross-linking agent, activator, accelerator, plasticizer, and filler, which filler composition is settable substantially solely by subjection of ultraviolet radiation thereto, and irradiating the applied composition with ultraviolet radiation for a sufficient period of time to effectively set the applied composition through the depth thereof.

Further such conventional systems require carrying out the repair operation at relatively warm temperatures such as 60° or above.

The requirement of relatively long curing times to assure full curing of the applied conventional compound presents additional problems of space, efficiency of repair operation and cost.

SUMMARY OF THE INVENTION

The present invention comprehends an improved filler compound and method of use thereof which eliminates the disadvantages of the prior art filler compounds and processes in a novel and simple manner.

The invention comprehends the provision of an improved filler compound which is caused to be cured by the application of ultraviolet radiation against an outer surface thereof so as to effect rapid curing of the applied compound to permit substantially immediate final repair operations such as sanding and painting.

The filler compound of the present invention comprises a one-component compound requiring no mixing by the user and which remains unset, or uncured, until applied and subjected to ultraviolet radiation. Thus the filler compound of the present invention provides for improved efficiency, and expedited repair.

In the illustrated embodiment the filler compound comprises a mixture of approximately 8.5% by weight diglycidyl ether of bisphenol A epoxy resin; approximately 8.5% by weight tripropyleneglycol diacrylate cross linking agent; approximately 17.0% by weight trimethylpropane triacrylate cross linking agent; approximately 1.7% benzophenone activator; approximately 0.42% N,N-dimethyl-p-toluidine accelerator; approximately 12.8% dioctyl phthalate; and approximately 51.1% filler.

The invention comprehends that the actuator be of high purity and in the illustrated embodiment the actuator is at least 85% pure.

In the illustrated embodiment the filler comprises calcium sulfate anhydrite.

In carrying out the improved repair operation utilizing the filler compound of the invention, ultraviolet radiation may be directed against the surface of the applied compound by means of a portable fluorescent lamp providing such radiation in the range of approximately 200–400 nanometers.

The compound permits use thereof in carrying out the repair operation at a relatively low temperature such as down to 30° F. thereby permitting improved efficiency and low cost in the repair operations such as where a relatively low ambient condition is obtained.

It has been found that a substantially complete curing of the applied compound may be effected by subjection to such ultraviolet radiation less than approximately 5 min.

The invention comprehends utilizing a mixture of cross linking agents so as to control the hardness of the cured compound for improved use such as an automobile body filler compound.

Thus the improved compound and method of use thereof are extremely simple and economical while yet providing the highly desirable advantages discussed above.

DESCRIPTION OF THE PREFERRED EMBODIMENT

As indicated briefly above, the present invention comprehends an improved method of repair of deformities in a wall such as a wall defining a portion of a vehicle body such as an automobile body. The filler composition, referred to in the repair art as a filler compound, is applied to the body at the irregularity which may comprise a hole or dent in the body wall after suitably preparing the body wall for reception of the compound in the normal manner. Such preparation steps are well known to those skilled in the art. However, it is well known that it is necessary to thoroughly clean the body portion to be repaired conventionally including steps of removing the old paint and rust as by sanding.

The filler compound of the present invention comprises a single component system requiring no mixing by the user and permitting the compound to be stored at room temperature until required for use. The compound prior to application has a putty like consistency permitting facilitated application to the prepared wall portion. Such application may be effected by conventional methods well known to those skilled in the art.

Until subjected to relatively high intensity ultraviolet radiation, the compound remains unset so that there is no requirement of immediately completion of the repair operation after the compound is applied to the wall portion. However, upon application of the compound, the user may then subject the compound to ultraviolet radiation directed against an outer surface thereof.

The irradiation of the compound may be effected by a conventional hand-held fluorescent lamp which in the present embodiment may be held approximately one foot from the surface of the applied compound. It has been found that a fluorescent lamp providing ultraviolet radiation having a wave length in the range of approximately 200–400 nanometers is highly efficacious in carrying out the process.

It has further been found that the subjection of the surface of the compound to the ultraviolet radiation does not form a protective skin preventing setting, or curing, of the compound inwardly of the surface but rather permits a rapid setting, or curing, of the entire body of applied compound within a very short time. Illustratively, utilizing a fluorescent lamp as discussed above, in setting a layer of applied compound having a thickness generally similar to that of the automobile body sheet metal wall, complete setting, or curing, of the compound, has consistently been effected in less than approximately five minutes.

Thus the set, or cured, compound is ready for sanding and final painting in a very short time providing substantially improved efficiency in the repair operations.

In the illustrated embodiment the filler compound comprises a mixture of approximately 8.5% by weight diglycidyl ether of bisphenol A epoxy resin; approximately 8.5% by weight tripropyleneglycol diacrylate cross linking agent; approximately 17.0% by weight trimethylpropane triacrylate cross linking agent; approximately 1.7% benzophenone activator; approximately 0.42% N,N-dimethyl-p-toluidine accelerator; approximately 12.8% dioctyl phthalate; and approximately 51.1% filler.

The ratio of the two cross linking agents may be varied to control the hardness of the set compound. However, it has been found that the indicated ratio provides an excellent, long-lasting repair material for use in repairing automobile bodies, boar bodies, and the like.

It has been found to be highly desirable to maintain the purity of the activator relatively high and in the illustrated embodiment it has been found efficacious to obtain optimum results to maintain the purity of the benzophenone activator at at least approximately 85% or higher.

One excellent material for use as the filler is calcium sulfate dihydrate. It will be obvious to those skilled in the art other suitable fillers may be utilized. It has been found that the filler compound of the present invention permits carrying out the repair operation at relatively low temperatures when desired. Thus the compound may be applied at temperatures down to 30° F., and illustratively may be applied in an environment having a temperature ranging from approximately 30° F. to 58° F.

The filler compound of the present invention permits a repair operation to be carried out in a manner similar to the conventional repair operations utilizing two component systems but with greater speed and lower cost and with overall improved efficiency. The filler compound has working characteristics generally similar to that of conventional peroxide cure body repair putties and has excellent adhesion, hardness characteristics, sandability, and paintability. The filler compound is relatively inexpensive and an indicated above may be stored for substantially instant use further improving the efficiency of the repair operation.

An example of the indicated resin constituent is that marketed by Celanese Specialty Resins of Los Angeles, Calif. under the trademark, Celrad 3700.

The foregoing disclosure of specific embodiments is illustrative of the broad inventive concepts comprehended by the invention.

I claim:

1. A filler composition curable by subjection to ultraviolet radiation, said compound comprising:
   approximately 8.5% by weight diglycidyl ether of bisphenol A epoxy resin;
   approximately 8.5% by weight tripropyleneglycol diacrylate cross-linking agent;
   approximately 17.0% by weight trimethyl propane triacrylate cross-linking agent;
   approximately 1.7% benzophenone activator;
   approximately 0.42% N,N-dimethyl-p-toluidine accelerator;
   approximately 12.8% dioctyl phthalate; and
   approximately 51.1% filler.

2. The filler composition of claim 1 wherein said activator is at least approximately 8.5% pure benzophenone.

3. The filler composition of claim 1 wherein said filler comprises calcium sulfate.

4. The filler composition of claim 1 wherein said filler comprises calcium sulfate anhydrite.

5. A filler composition curable by subjection to ultraviolet radiation, said composition comprising:
   approximately 8.5% by weight diglycidyl ether of bisphenol A epoxy resin;
   approximately 25.5% of 25.5% of a combination of diacrylate and triacrylate cross-linking agents;
   approximately 1.7% benzophenone activator;
   approximately 0.42% N,N-dimethyl-p-toluidine accelerator;
   approximately 12.8% dioctyl phthalate; and
   approximately 51.1% filler.

6. The filler composition of claim 5 wherein said activator is at least approximately 8.5% pure benzophenone.

7. The filler composition of claim 5 wherein said filler comprises calcium sulfate.

8. The filler composition of claim 5 wherein said filler comprises calcium sulfate anhydrite.

9. The method of filling deformities in a vehicle body wall for repair thereof, comprising the steps of:
   applying to a deformity filler composition comprising approximately 8.5% by weight diglycidyl ether of bisphenol A epoxy resin, approximately 25.5% of a combination of diacrylate and triacrylate cross-linking agents, approximately 1.7% benzophenone activator, approximately 0.42% N,N-dimethyl-p-toluidine accelerator, approximately 12.8% dioctyl phthalate, and approximately 51.1% filler; and
   irradiating the applied composition with ultraviolet radiation for a sufficient period of time to effectively set the applied composition.

10. The method of filling deformities in a vehicle body wall for repair thereof of claim 9 wherein said ultraviolet radiation has a wavelength in the range of approximately 200–400 nanometers.

11. The method of filling deformities in a vehicle body wall for repair thereof of claim 9 wherein the irradiating step is carried out at an ambient temperature in the range of approximately 30° F. to approximately 58° F.

12. The method of filling deformities in a vehicle body wall for repair thereof of claim 9 wherein said period of time of irradiation is less than approximately 5 minutes.

13. The method of filling deformities in a vehicle body wall for repair thereof of claim 9 wherein the irradiation is effected by means of a fluorescent lamp spaced approximately one foot from the applied compound.

14. The method of filling deformities in a vehicle body wall for repair thereof of claim 9 wherein the applied composition is caused to set throughout its thickness by ultraviolet radiation applied to an outer surface only thereof.

15. The method of filling deformities in a vehicle body wall for repair thereof of claim 9 wherein said activator is at least approximately 85% pure.

* * * * *